United States Patent [19]

Mazuera et al.

[11] Patent Number: 4,880,706

[45] Date of Patent: Nov. 14, 1989

[54] BIAXIALLY ORIENTED MULTILAYER BARRIER FILMS

[75] Inventors: Gonzalo E. Mazuera, Farmington; John R. Wagner, Jr., Rochester, both of N.Y.

[73] Assignee: Mobil Oil Corp., New York, N.Y.

[21] Appl. No.: 105,073

[22] Filed: Oct. 5, 1987

[51] Int. Cl.[4] .......................... B32B 27/08; B29F 3/06
[52] U.S. Cl. ................................... 428/516; 428/349; 428/520; 428/910; 264/171; 426/127
[58] Field of Search ................ 428/349, 516, 520, 910

[56] References Cited

U.S. PATENT DOCUMENTS

| 3,448,183 | 6/1969 | Chisholm . | |
|---|---|---|---|
| 3,555,604 | 1/1971 | Pahlke | 18/14 |
| 3,882,259 | 5/1975 | Nohara et al. | 428/35 |
| 4,152,387 | 5/1979 | Cloeren . | |
| 4,533,510 | 8/1985 | Nissel . | |
| 4,561,920 | 12/1985 | Foster . | |
| 4,650,721 | 3/1987 | Ashcraft et al. . | |
| 4,713,296 | 12/1987 | Aoyama et al. | 428/518 |

FOREIGN PATENT DOCUMENTS 0092897 11/1983 European Pat. Off. .

OTHER PUBLICATIONS 3,398,431, Corbett Filed 10/23/64 (OG except only).

Primary Examiner—P. C. Ives
Attorney, Agent, or Firm—Alexander J. McKillop; Charles J. Speciale; Robert B. Furr, Jr.

[57] ABSTRACT

Films having a core of ethylene-vinyl alcohol copolymer (EVOH) sandwiched between polyolefin, e.g. polypropylene are coextruded so that the polyolefin also encapsulates the EVOH layer on the side edges. The films which can contain adhesive layers are oriented greater than 4 greater in the machines direction and greater than 7 greater in the transverse direction to give excellent oxygen and moisture barrier properties.

9 Claims, No Drawings

BIAXIALLY ORIENTED MULTILAYER BARRIER FILMS

BACKGROUND OF THE INVENTION

Ethylene vinyl alcohol copolymer (EVOH) films are excellent barriers to oxygen, carbon dioxide and nitrogen. They are also effective barriers against odors and the loss of flavor. EVOH resins, are moisture sensitive and the barrier properties are reduced in the presence of high humidity. Polypropylene offers excellent moisture barrier properties, together with good strength properties and a high use temperature. When EVOH resins are encapsulated by layers of polypropylene, they ar protected from moisture and therefore retain their barrier characteristics.

The biaxial orientation of EVOH films enhances their gas barrier properties as well as reduces their susceptibility to moisture. The biaxial orientation of polypropylene increases its stiffness and enhances both its optical and other physical properties such as tensile strength, tear strength, and other mechanical properties.

Biaxially oriented coextruded multilayer films in which an EVOH layer is sandwiched between two polyolefin layers, particularly polypropylene layers are described in U.S. Pat. No. 4,561,920 which is incorporated herein by reference. The composite is oriented a maximum of four times in the machine direction (MD) and seven times in the transverse direction (TD).

In accordance with this invention mulilayer films of the same or similar components are successfully oriented to a greater extent than in U.S. Pat. No. 4,561,920 and the benefits of improved film quality associated with higher degrees of orientation are obtained.

SUMMARY OF THE INVENTION

Multilayer films are extrudated to provide a core layer of ethylene-vinyl alcohol copolymer (EVOH) which is encapsulated on its top and bottom surfaces by a polyolefin layer, particularly polypropylene. The extrudate is cooled and subjected to machine direction (MD) orientation to a degree of greater than four times, and to transverse direction (TD) orientation to a degree of greater than seven times. The resulting film exhibits better barrier properties to moisture and gases such as oxygen than prior art films which are oriented to a lesser degree.

DETAILED DESCRIPTION OF THE INVENTION

The ethylene vinyl alcohol (EVOH) copolymers used in invention are the saponified or hydrolyzed product of an ethylene-vinyl acetate copolymer having, generally, an ethylene content of 25 to 75 mole percent. It is preferred that the percent ethylene in the EVOH be at least 45 percent so that the EVOH is flexible enough to be stretched during the orientation process. The degree of hydrolysis should reach at least 96 percent, preferably at least 99 percent. It is also preferred that the degree of hydrolysis be greater than 96 percent because below that the barrier properties are less than optimum. In general, those skilled in the art know that it desirable that the melt flow rate of the EVOH be at least 4 grams per 100 minutes at 190° C. and a load of 2,160 grams for melt viscosity match between EVOH, adhesive and polypropylene. If the melt flow rate is greater than 4 grams per 100 minutes then the viscosities of the EVOH, adhesive, and skin layer are difficult to match. It is important to match the viscosities of these materials to avoid interfacial instability which causes waviness of the melt and uneven distribution of the layers, otherwise known as flow disturbance due to viscosity discontinuities. The viscosity of these materials is most easily and effectively matched by monitoring the melt flow rate of the materials.

In the present invention, however, excellent PP/adhesive/EVOH viscosity match was achieved with EVOH copolymer resins with melt flow rate ranging between 14 to 18 gm. per 10 minutes at 190° C.

The polyolefin can be polyethylene, including high density polyethylene and linear low density polyethylene, polypropylene, poly (alpha-methylpentene) and copolymers of ethylene with other olefins. The preferred polyolefins are polypropylene and ethylene-propylene copolymers containing predominately propylene. The melt flow rate of the polyolefin layer is preferred to be in the 2 to 6 range. For propylene-ethylene copolymers, it is preferred that the melt flow rate be from about 2.5 to about 6.0 grams per 10 minutes at 230° C. and a load of 2,160 grams. For polypropylene, it is preferred that the melt flow rate be from about 2.5 to about 4.5. In this range, the viscosities of the copolymer and the polypropylene are most compatible with EVOH and the adhesive. Also, in this range, orientation of the copolymer or the polypropylene results in the best properties.

The adhesive layer when used can be any of a number of proprietary materials such as described in U.S. Pat. No. 4,561,920. Suitable adhesives include CXA-3036 (an ethylene-vinyl acetate copolymer available from Du Pont) the Admer (TM) adhesives from the Mitsui Petrochemical Company, and the Plexar (TM) family from USI chemicals.

The adhesive layer can be dispensed with by including an adhesion promoter in the polyolefin layers as described in U.S. Pat. No. 4,650,721 which is incorporated herein by reference. That patent discloses the polyolefin layers (polypropylene) which contain a maleic acid anhydride modified olefin polymer.

The method of making the biaxially oriented composite barrier film having three or more layers consists of four distinct steps which together comprise a relatively simple operation which can be conducted in a continuous manner.

First, the composite sheet, consisting of polypropylene, for example, formed by coextrusion of the components. One way of accomplishing this is to use several extruders and have the materials fed into a combining feed block. Within the feed block, the materials are layered to form the multi-layer melt stream. The melt stream is fed into a slot cast sheet die or other type of die to form the multi-layer sheet. As the sheet exists the die, it is immediately cooled by use of a cooling drum or a water bath to a temperature of about 45° to 50° C.

Immediately after cooling, the composite sheet is fed into an apparatus for MD orientation of plastic material. Any such apparatus can be used in the present invention. One example would be to feed the composite sheet into a set of differential speed heated rollers to stretch the sheet in the longitudinal direction to a degree of about greater than 4:1 to about 7:1, preferably 5:1 to 7:1. Next, the sheet can be fed to a tenter frame where it is stretched in the transverse direction to a degree of greater than 7:1 to about 10:1, preferably 8:1 to 9:1. MD orientation is generally conducted by preheating the film at 135° to 150° C., stretching in the same temperature range, and annealing at about 120° C. to 130° C. Preheating for TD orientation is advantageously done at 170° to 180° C., stretching at 155° C. to 165° C. and annealing at 165° to 170° C.

The given temperature ranges are for polypropylene. They will vary for other polyolefins. For example with copolymers of ethylene and propylene the given temperature may be 5 to 10° C. lower.

Finally, the sheet can optionally be subjected to corona discharge treatment in the known manner to improve its surface characteristics particularly it printability.

Preferably, the multilayer extrusion is conducted in a Cloeren feedblock which is commercially available and is described in U.S. Pat. No. 4,152,387. U.S. Pat. No. 4,152,387 is incorporated herein by reference. The Cloeren feedblock permits a great degree of control of the relative thickness of the several layers and permits the extrusion of polymers which have widely differing melt flow.

It has been recognized in the art that encapsulation of the inner layer or layers of a multilayer film may be desirable. In a A-B-A coextruded composite film encapsulation means that the top surface, bottom surface and both sides (transverse direction) of the B layer are covered by the A layer. For example, U.S. Pat. Nos. 3,398,431, 3,448,183 and 4,533,510 all of which are incorporated herein by reference, describe multilayer films having an encapsulated layer and dies suitable for production of such films.

The production of films in which the EVOH is encapsulated by the polypropylene layer on its sides as well as its major surfaces is an important feature of the method of this invention. BEcause the EVOH layer is less viscous than the polypropylene in its normal molten condition after it emerges form the Cloeren feedblock the EVOH would leak out from the edges without the polypropylene encapsulation along the transverse direction edges. Accordingly, the Cloeren feedblock is modified by providing lateral cuts in the outer edges of the vane surface to permit greater flow of polymer at the outer edges than in the center of the feedblock whereby the outer layer or layers of polymer envelop the sides of the B core layer (EVOH).

The films of this invention are suitable in a variety of applications in which moisture and gas barrier properties are desired. The films are particularly useful in food packaging.

The invention is illustrated by the following non-limiting examples in which all parts are by weight unless otherwise specified.

EXAMPLE 1

A five-layer ABCBA sheet was coextruded using three extruders to form a 1.0 mil film. The sheet comprises: A polypropylene homopolymer (A layer) an adhesive layer (B layer), an EVOH layer (C layer), a second adhesive layer (B layer and a second polypropylene homopolymer (A layer). The molten materials were fed into a Cloeren five-layer coextrusion feedblock with an ABCBA plug where they were combined to form a single ABCBA structure. The molten composite was fed into a slot cast sheet die at 30 fpm to get the five layer sheet. This sheet was then cooled to 49° C. by means of a water bath and cast drum. AFter cooling, the basesheet was fed into a set of differential draw heated rolls which stretched it in the longitudinal or machine direction (MD). The sheet was then fed to a tenterframe where it was stretched in the transverse direction (TD). After the biaxial orientation the film was passed through a set of corona treatment rolls to impart surface treatment and render the film printable.

| Main extruder (A layer): | Polypropylene Fina W-472 |
| Satellite 1 (B layer): | Adhesive DuPont CXA-3036 |
| Satellite 2 (C layer): | EVAL EP-G grade made by Kuraray Co. |

| | Orientation Conditions: | | | |
|---|---|---|---|---|
| | Draw | Preheat, °C. | Stretch, °C. | Anneal, °C. |
| MDX | 5 | 143 | 143 | 127 |
| TDX | 8 | 175 | 162 | 166 |

EXAMPLE 2

Same conditions as in Example 1, except that the degree of orientation was 5 MDX and 9.6 TDX.

EXAMPLE 3

Same conditions as in Example 1, except that the degree of orientation was 6 MDX and 9.6 TDX.

EXAMPLE 4

Same conditions as in Example 1, except that the degree of orientation was 7 MDX and 9.6 TDX.

The Table summarizes the optical and barrier properties for the multilayer barrier films produced with the stated conditions.

Briefly, an increment in orientation conditions from 5 MDX and 8 TDX to 7 MDX and 9.6 MDX, brings improvements in the final film equivalent to over 60% lower in haze, 6% higher in gloss and 30% better in oxygen barrier. The result is a clearer film with higher barrier properties.

TABLE

| | Orientation | | Optics | | $O_2$ |
|---|---|---|---|---|---|
| Example | MDX | TDX | Haze, % | Gloss, % | Transmission* |
| 1 | 5 | 8 | 1.6 | 85.6 | 0.97 |
| 2 | 5 | 9.6 | 0.9 | 90.1 | 0.82 |
| 3 | 6 | 9.6 | 0.7 | 90.3 | 0.75 |
| 4 | 7 | 9.6 | 0.6 | 91.0 | 0.68 |

*$O_2$ transmission in cc/100 sq. in. 1 day ATM dry. (ASTM D3985-81)

We claim:

1. A multilayer coextruded film which has been biaxially oriented from greater than 4:1 to about 7:1 in the machine direction and from greater than 7:1 to about 10:1 in the transverse direction, comprising:
   (1) at least one (C) layer of an ethylene vinyl alcohol copolymer, and
   (2) at least two (A) layers of polyethylene, polypropylene, poly (alpha-methylpentene), or copolymers of ethylene and higher olefins on opposite sides of sides (C) layer.

2. The film of claim 1 in which said (A) layers surround said (C) layer on its top, bottom and sides.

3. The film of claim 1 in which at least two additional adhesive layers (B) are present to form the configuration ABCBA in which the (B) layers are surrounded by said (A) layers on their surfaces opposite to C and on their transverse direction sides.

4. The film of claim 9 in which said (A) layers comprise polypropylene.

5. The film of claim 3 in which said (A) layers comprise polypropylene.

6. The film of claim 2 in which the machine direction orientation is to a degree of about 5:1 to about 7:1 and transverse direction orientation is to a degree of about 8:1 to 10:1.

7. The film of claim 3 in which the machine direction orientation is to a degree of about 5:1 to about 7:1 and transverse direction orientation is to a degree of about 8:1 to 10:1.

8. The film of claim 4 in which the machine direction orientation is to a degree of about 5:1 to about 7:1 and transverse direction orientation is to a degree of about 8:1 to 10:1.

9. The film of claim 5 in which the machine direction orientation is to a degree of about 5:1 to about 7:1 and transverse direction orientation is to a degree of about 8:1 to 10:1.

* * * * *

UNITED STATES PATENT AND TRADEMARK OFFICE
CERTIFICATE OF CORRECTION

PATENT NO. : 4,880,706

DATED : November 14, 1989

INVENTOR(S) : G.E. Mazuera et al

It is certified that error appears in the above-identified patent and that said Letters Patent is hereby corrected as shown below:

| | |
|---|---|
| Col. 1, line 14 | "ar" should be --are-- |
| Col. 1, line 64 | "100" should be --10-- |
| Col. 1, line 67 | "100" should be --10-- |
| Col. 3, line 35 | "BEcause" should be --Because-- |
| Col. 3, line 59 | insert --)-- after "(B layer" |
| Col. 3, line 66 | "AFter" should be --After-- |

Signed and Sealed this

Thirteenth Day of November, 1990

Attest:

HARRY F. MANBECK, JR.

*Attesting Officer*  *Commissioner of Patents and Trademarks*